United States Patent [19]

Engebreth

[11] 4,211,115
[45] Jul. 8, 1980

[54] DEVICE FOR PROTECTING WINE AGAINST EXCESSIVE EXPOSURE TO AIR

[76] Inventor: Roald N. Engebreth, 15900 Sonoma Hwy., Sonoma, Calif. 95476

[21] Appl. No.: 18,854

[22] Filed: Mar. 8, 1979

[51] Int. Cl.² .............................................. G01N 1/10
[52] U.S. Cl. .................................. 73/421 B; 99/277.1; 217/72; 217/98
[58] Field of Search .................... 73/421 R, 421 B; 217/72, 101, 98; 222/386.5; 99/277.1

[56] References Cited

U.S. PATENT DOCUMENTS

| 262,773 | 8/1882 | Hohl ................................. 222/386.5 |
| 276,083 | 4/1883 | Schunck ............................ 217/101 |
| 534,541 | 2/1895 | Wright et al. ..................... 222/386.5 |
| 3,083,098 | 3/1963 | Sullivan ............................. 217/72 |

Primary Examiner—S. Clement Swisher
Attorney, Agent, or Firm—Melvin R. Stidham

[57] ABSTRACT

A device for protecting wine against the harmful oxidation and spoilage resulting from ullage (air space) which develops in wine aging containers. An inflatable bladder within the container, but free of contact with the inner surface thereof, is in communication with a reservoir of water disposed above the container, enabling it to expand to replace the volume of wine that normally seeps out of the container. A second duct allows the escape of air usually trapped, and a third duct may be opened to allow the water in the bladder to force out a sample of wine for tasting.

7 Claims, 3 Drawing Figures

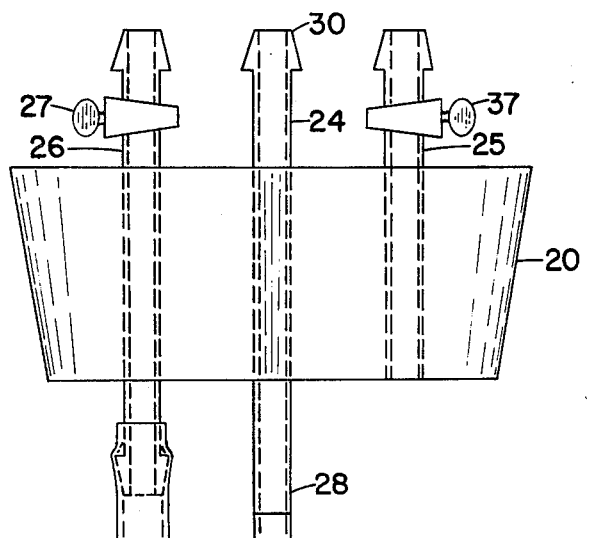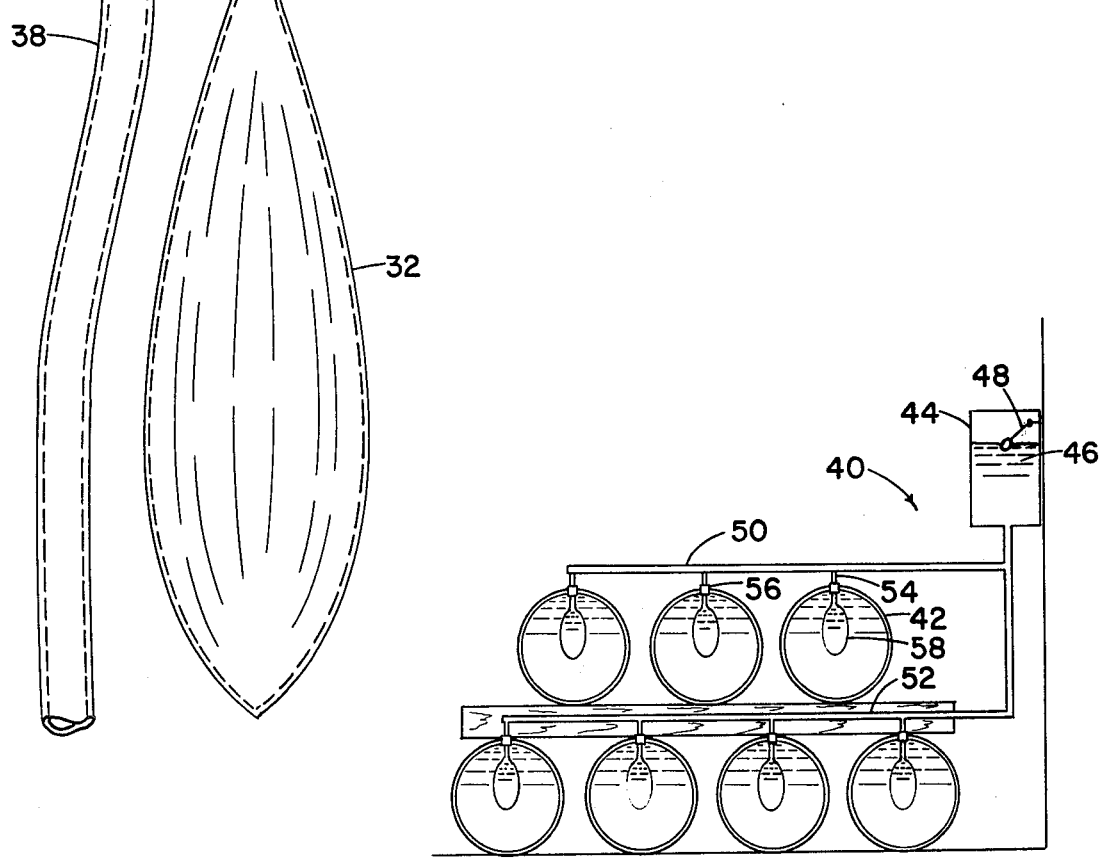
Fig. 2
Fig. 3

DEVICE FOR PROTECTING WINE AGAINST EXCESSIVE EXPOSURE TO AIR

BACKGROUND OF THE INVENTION

Unwanted oxidation is harmful to the color, taste, composition and quality of wine. Prevention of oxidation and spoilage which would otherwise result from air contact is a major concern during the production and aging of quality wine, and it is a common practice to minimize such oxidation by periodically adding more wine to "top up" the barrels or containers and reduce the ullage which forms at the top of the containers as the wine volume "shrinks" due to seepage, contraction, sampling and the like. The "topping up" process is time consuming and costly and, in fact, exposes the wine to air each time the container is opened to enable addition of the "fill wine". Further, a costly variety of sizes of cooperage is required to keep the ever decreasing volume of wine in fully filled containers. Other methods have been used to reduce oxidation, such as by introducing nitrogen or carbon dioxide into the head space of partially filled containers. However, because of the penetration of oxygen and loss into the wood by diffusion, this is not successful in containers that do not have impervious walls. Olive oil has been floated on top of wine to insulate it from air in partially filled containers, but this degrades the taste of the wine and renders the barrels difficult to clean.

SUMMARY OF THE INVENTION

In carrying out this invention, I provide a bung or cap which is adapted to be inserted into an opening in the aging container. A first duct or tube extends through the bung with inner and outer ends displaced from the inner and outer surfaces thereof and an inflatable bladder is connected to the inner end which, being displaced from the bung's surface holds the bladder out of contact with the surrounding wood of the container. A water reservoir disposed above the container is connected to the tube so that water is fed to the bladder to expand it to replace wine lost by seepage. A second tube extending through the bung has a valve in it which may be opened when the bladder is first inserted to enable the displaced air to escape. With the bladder displaced from the surface of the wooden container, the water therein, being heavier than wine holds it out of contact. A third tube extending through the bung has a valve which may be opened as desired to permit recovery of small quantities of wine for tasting.

BRIEF DESCRIPTION OF THE DRAWING

In the drawing:

FIG. 2 is an enlarged view of the fitted device of this invention; and

FIG. 3 is a cross-section of a group of barrels utilizing a modification of the embodiment of FIG. 1

DESCRIPTION OF PREFERRED EMBODIMENTS

Figure 1:
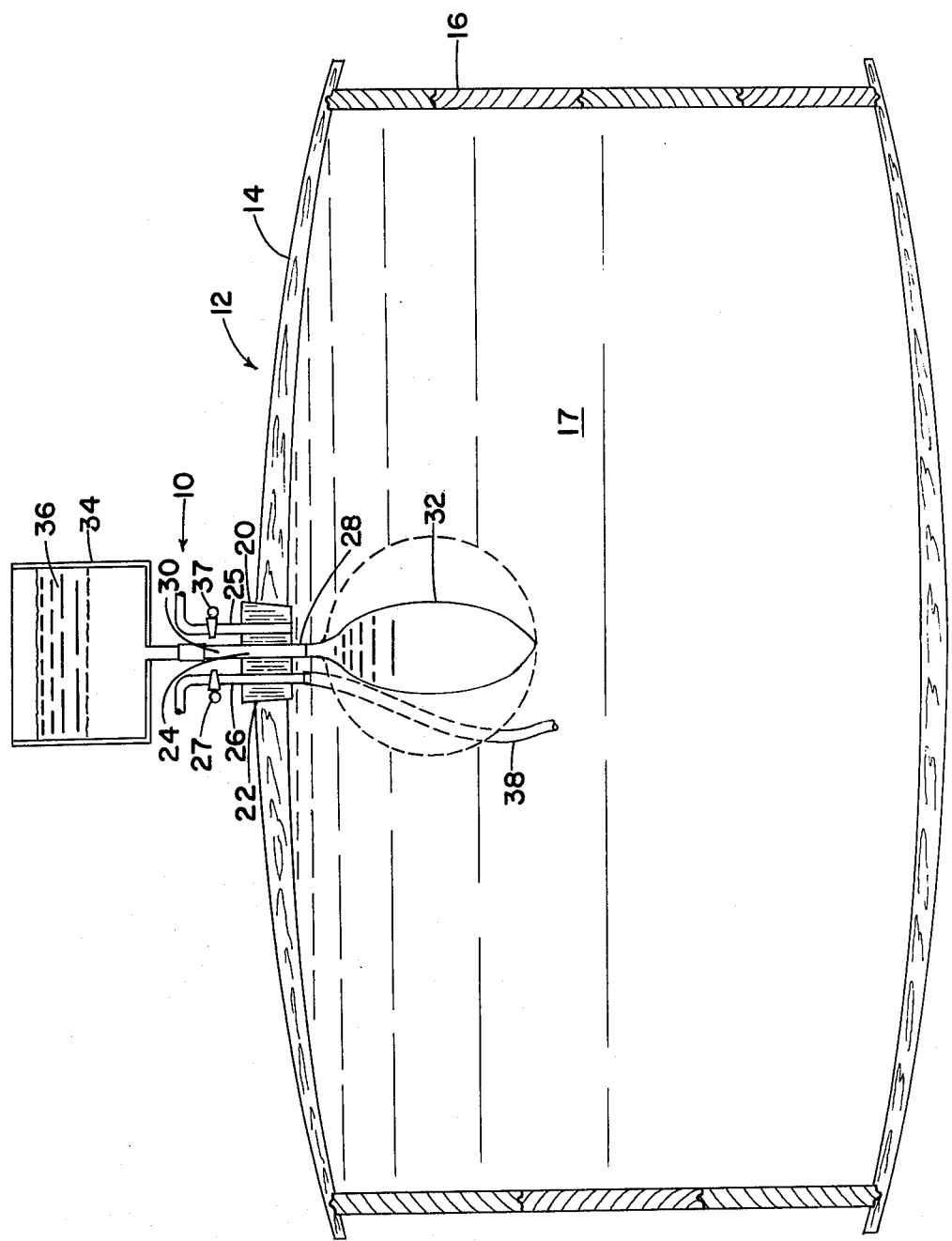
FIG. 1 is a cross-section of a barrel of wine showing the device of this invention.

Referring now to the drawing with greater particularity, the wine protecting device 10 of this invention is shown mounted on a wooden barrel 12 with conventional, bowed staves 14 and circular end closures 16 of oak or the like to impart a distinctive flavor to the wine aging therein. The barrel 12 is shown positioned on its side, as is conventional when aging wine 17.

The wine protecting device 10 includes a bung 20 which is received in an opening 22 in the side of the barrel 12, and extending through the bung are first, second and third tubes or ducts 24, 25 and 26. The fill duct 24 has inner and outer ends 28 and 30 which are displaced from the inner and outer surfaces of the bung 20 for a purpose hereinafter to be described.

Secured on the inner end 28 of the fill duct 24 is an inflatable bladder or bag 32 of a suitable plastic material, and connected to the upper end of the tube 30 is a reservoir 34 of water 36, or other liquid having higher specific gravity than wine. Hence, as wine seeps or is taken from the barrel 12, water from the reservoir 34 enters through the tube 24 to further expand the bag 32 to maintain the barrel 12 full of wine. Because the end of the first tube 24 is displaced from the inner surface of the bung 20, and because the water is heavier than wine, the bag 32 will not float on the wine but, remains submerged and free of contact with the inner surface of the barrel 12 so that the entire inner surface of the barrel is exposed to contact by the wine therein to continue to impart the desired flavor to the wine. In addition, the staves 14 are not allowed to dry out in spots by losing contact with wine. Such drying could cause shrinking of the staves and create leaks.

A small selectively operated valve 37 is provided in the second or bleed duct 25 to facilitate evacuation of the barrel. Hence, when the bung is first placed, any air trapped within the barrel is forced out through the bleed tube 25 with open valve 37 by the influx of water into the bag 32. When wine begins to flow from the tube 25 the valve may be closed and the interior of the barrel 12 is free of air.

The third duct 26 has a hose 38 extending therefrom of a length selected by the wine maker to reach the particular level of wine 17 from which he wishes to draw off the samples for testing and tasting. In any event, when the valve 27 is opened, the weight of the water 36 will force wine out through tube 26. The amount of wine which previously filled the hose 38 and tube 26 may be discarded and any further amount drawn off will be from the level selected.

If it is desired to remove the bladder 32 from the barrel 12, the reservoir 34 may be removed and a syphon tube inserted onto the tube 24 to syphon off the water in the bladder 32 to collapse it for removal.

Referring now to FIG. 3, I have shown an arrangement wherein a manifold system 40 may be employed to protect a plurality of barrels 42 in accordance with this invention. There, a principal reservoir 44 is kept filled with water to a desired level 46 by means of a conventional float valve 48. The water is delivered through manifold ducts 50 and 52 with branch lines 54 extending to each bung 56 to inflate a bladder 58. Of course while not evident in the scale of this view, the bungs 56 will also be provided with air bleed tubes and taster tubes as described in connection with FIGS. 1 and 2.

While this invention has been described in conjunction with a preferred embodiment thereof, it is obvious that modification and changes therein may be made by those skilled in the art without department of spirit and scope of this invention, as defined by the claims appended hereto.

Having described my invention, I claim:

1. A device for protecting wine being aged in a wooden container comprising:

a closure adapted to cover an opening in the container;

a fill duct extending through said closure to terminate in inner and outer ends displaced from the inner and outer surfaces of said closure;

An inflatable bladder the interior of which is in communication with the inner end of said fill duct;

a reservoir of liquid of a specific gravity higher than that of wine;

means for positioning said reservoir above said container; and a tube for connecting said reservoir to the outer end of said fill duct;

said tube and said fill duct being open to provide continuous communication between said reservoir and said bladder.

2. The device defined by claim 1 wherein the liquid in said reservoir is of a specific gravity higher than that of wine.

3. The device defined by claim 1 wherein:

said liquid in the said reservoir is water.

4. The device defined by claim 1 including:

an air bleed duct extending through said closure to terminate in a discharge end displaced from the outer surface of said closure;

a valve in said air bleed duct.

5. The device defined by claim 1 including:

a sampler duct extending through said closure to terminate in a discharge end displayed from the outer surface of said closure;

a valve in said sampler duct.

6. The device defined by claim 5 including:

a length of tubing extending from the lower end of said sampler duct.

7. The device defined by claim 1 including:

a second closure to cover an opening in a second container;

a second fill duct extending through said second closure;

a second inflatable bladder connected to said second fill duct; and wherein said tube connects said reservoir to the outer ends of both of said fill ducts.

* * * * *